United States Patent Office 3,256,662
Patented June 21, 1966

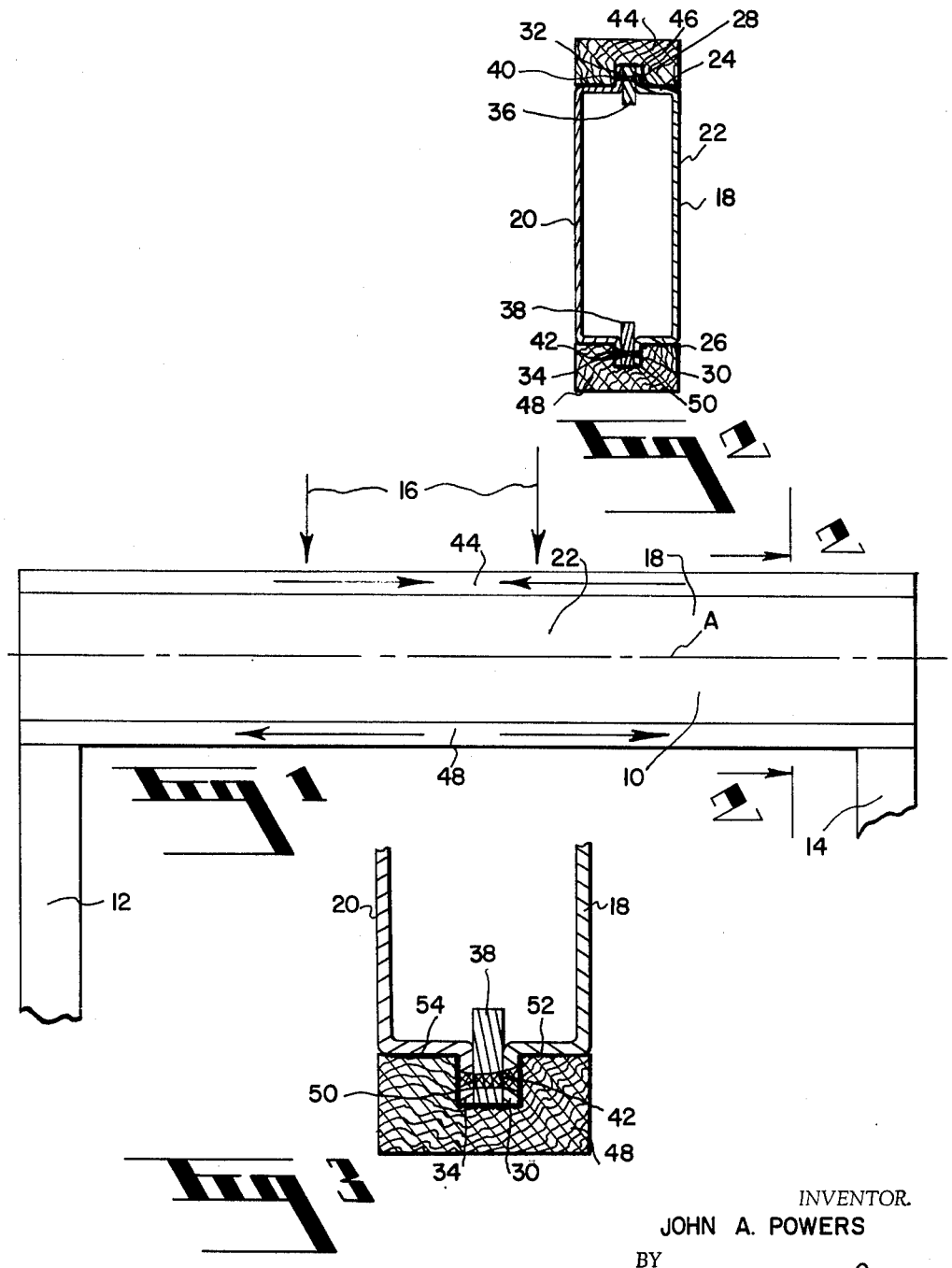

3,256,662
PREFABRICATED LAMINATED BEAM STRUCTURES
John A. Powers, 3616 N. 54th Place, Phoenix, Ariz.
Filed Sept. 19, 1963, Ser. No. 310,061
4 Claims. (Cl. 52—376)

This invention relates to a beam construction, and, more particularly to a fabricated beam construction for use in various building structures to horizontally span areas between walls or columns and for supporting various structures thereon and thereabove.

In the prior art various beam structures have been produced for the purpose of horizontally spanning areas between walls, columns, or other structures, and for the purpose of supporting various structures and loads thereabove. As, for example, a common fabricated beam construction comprises conventional two-by-four lumber laminated or cemented together to form a beam having considerable depth of section above and below the neutral axis of the beam. When fabricating beams of several timbers a rather uniform structure is attained, and with the use of high strength resins such beams have been fabricated particularly because of their compatability with various building construction requiring wooden top plates on the walls to which rafters or other similar structure may normally be nailed. Thus horizontal beams which are to be used in wooden house structures or building structures, or in combination structures involving concrete block walls and wooden roof rafters, it is desirable that the beam construction be provided with nailers at the upper and lower portions thereof above and below the neutral axis of the section.

Fabrication of a laminated beam structure involves considerable labor in finishing the lumber, gluing it together, and clamping it until the glue is set. In such gluing operations various resins may be used, including wall known epoxy resins or other suitable resins. However, such fabricated beam structures of the prior art are expensive to produce and are quite heavy in weight.

Accordingly, it is an object of the present invention to provide a beam construction wherein a hollow box-shaped in cross-section metal structure is fabricated of two hat-sections having mating flanges which are retained in upper and lower wooden plates; said plates having grooves to contain the flanges which are butted together in opposed relationship to each other and spot welded so that the fabricated metal section is thus readily secured to wooden nailers at the upper and lower extremities thereof.

Another object of the invention is to provide a composite beam construction employing a rectangular in cross-section hollow fabricated metal structure having upper and lower stress bearing wooden nailers connected therewith.

Another object of the invention is to provide a novel beam construction employing a pair of hat-sections having flanges secured together; said flanges being disposed in grooves of wooden members and secured therein to provide a very strong, light weight, composite beam construction.

Another object of the invention is to provide a beam construction employing a hollow rectangular in cross-section structure composed of a pair of hat-sections between which compression and tension bearing members are disposed above and below the neutral axis of the section, whereby these tension and compression bearing members are secured between the flanges of the hat-section structures when they are spot welded or otherwise secured together.

A further object of the invention is to provide a very novel and economical beam construction having a wide variety of uses in the building industry, and which is very durable and structurally desirable.

Further objects and advantages of the invention may be apparent from the following specification, appended claims and accompanying drawings in which:

FIGURE 1 is a side elevational view of a horizontal beam construction shown supported at its opposite ends on column or wall structures, and disposed to span a distance between the column or wall structures and carry a load imposed thereabove;

FIGURE 2 is an enlarged cross-sectional view of the beam construction taken from the line 2—2 of FIGURE 1; and FIGURE 3 is an enlarged fragmentary view similar to a lower portion of FIGURE 2, but showing the construction in greater detail.

As shown in FIGURE 1, the invention relates to a beam structure 10 which may be used as a horizontal structure but which may be employed vertically, if desired.

This beam structure 10 is disposed to be supported on columns 12 and 14, and to span a distance therebetween. This beam 10 is also disposed to carry a load imposed in a downward direction as indicated by arrows 16 in FIGURE 1 of the drawings.

The beam structure 10, as shown in cross-section in FIGURE 2 of the drawings, is provided with a pair of metallic members 18 and 20 which are hat-shaped in cross-section, each cross-section being similar to each other, thus the hat-section 18 will be described in detail. The hat-section 18 is provided with a flat side wall 22 having integral wall portions 24 and 26 disposed at right angles thereto, and integral with the walls 24 and 26 are flanges 28 and 30 which are disposed at right angles to the walls 24 and 26 and substantially parallel to the wall portion 18. Thus a hat-shaped in cross-section member 18 is fabricated and an identical hat-section 20 is provided with flanges 32 and 34, similar to the flanges 28 and 30 but opposed thereto, and the flanges 28 and 32 are secured together while the flanges 30 and 34 are secured together.

Sandwiched between the flanges 28 and 32 is a compression bearing member 36 and sandwiched between the flanges 30 and 34 is a tension bearing member 38.

It will be seen that the hat-shaped in cross-section members 18 and 20 may be made of sheet metal, as, for example, 16-gauge sheet metal may be preferred for a given hat-section structure to form a beam construction while the compression and tension bearing members 36 and 38 may be made of straps of steel one-quarter of an inch thick, if desired.

The flanges 28 and 32 and the compression bearing member 36 may be spot welded or riveted, or bolted together, as desired. The structure as shown is provided with a spot weld 40 securing the flanges 28 and 32 and the compression bearing member 36. Likewise, a spot weld 42 secures the flanges 30 and 34 and the tension bearing member 38 together. Otherwise a bolt or rivet might be placed through openings in these structures, if desired.

A wooden nail receiving member 44, similar in cross-section to a two-by-four or other comparable timber, serves as a stress bearing and nail receiving member on the upper or compressive portion of the section. This nail receiving member 44 is provided with an inverted channel-shaped groove 46 in which the flanges 28 and 32 are disposed. An epoxy resin or other suitable adhesive is placed in the groove 46 and around the flanges 28 and 32 and around the upper wall portion 24 of the section 18 and the comparable wall of the section 20. Another stress bearing nail receiving member 48 at the lower portion of the section is provided with a longitudinal groove 50 in which the flanges 30 and 34 are positioned and in which they are secured by epoxy or other suitable resin.

This structure is shown on an enlarged scale in FIGURE 4 of the drawings so that the flanges 30 and 34 are clearly shown with the compression resisting member 38 sandwiched therebetween. The spot weld 42, as hereinbefore described, may be substituted for by a bolt or rivet.

Epoxy resin, or other equivalent material, is used to adhere the nail receiving member 48 to the flanges 30 and 34 and to lower portions of the structures 18 and 20, as indicated at 52 and 54 in FIGURE 4 of the drawings.

It will be seen that the nail receiving members 44 and 48 provide means for holding nails and resisting compression and tension, respectively at the upper and lower portions of the beam structure 10, and that this beam structure is provided with a neutral axis when in horizontal position, said neutral axis being generally indicated by a line A, so that load bearing on the upper portion of the beam structure, as indicated by arrows 16, causes compression above the neutral axis and tension below the neutral axis. The compression resisting plate 36 and timber 44 are above the neutral axis A, and the tension resisting plate 38 and timber 48 are below the neutral axis A, and the plates 36 and 38 are structurally secured and held in position between the flanges of the hat-sections 18 and 20 and are coextensive therewith, and coextensive with the nail receiving members 44 and 48 as shown in FIGURES 1 and 2 of the drawings.

Additionally the compression and tension resisting straps 36 and 38 being disposed above and below the neutral axis respectively renders the section of the invention stronger in proportion to its overall weight.

While the hat-sections 18 and 20 may be made of steel or any other suitable material, the nail receiving member 44 and 48 retain all the advantages of the structure with relation to its incorporation into wooden buildings or buildings having a combination of wooden or masonry construction.

It will be obvious to those skilled in the art that various modifications of the present invention may be resorted to in a manner limited only by a just interpretation of the following claims.

I claim:

1. In a beam construction the combination of: a pair of hat-shaped in cross-section metallic structural members opposed to each other; complemental flanges of said structural members secured together and disposed at upper end and lower edges thereof, stress bearing wooden members having notch portions therein in which said flanges are secured, thereby providing wooden nail receiving members at the upper and lower portions of the beam structure, said wooden members disposed to bear compression and tension stresses at said upper and lower portions respectively.

2. In a beam construction the combination of: a pair of generally hat-shaped in cross-section members disposed in opposed relationship to each other; each hat-shaped in cross-section member having a vertically disposed side portion; a pair of horizontally disposed wall portions integral with and at right angles to said side portion; a pair of vertically disposed flanges extending from said wall portions respectively and outwardly away from said wall portions in substantial parallelism with said side portion; said flanges, of said pair of hat-shaped in cross-section members, being secured together and extending outwardly beyond said wall portions thereof, two of said secured together flanges disposed and directed upwardly from an upper portion of said beam construction and the remaining two of said flanges disposed and directed downwardly from a lower portion of said beam construction; stress bearing wooden members having grooves therein in which said flanges are disposed; and means for securing said flanges in said groove portions.

3. In a beam construction the combination of: a pair of generally hat-shaped in cross-section members disposed in opposed relationship to each other; each hat-shaped in cross-section member having a vertically disposed side portion; a pair of horizontally disposed wall portions integral with and at right angles to said side portion; a pair of vertically disposed flanges extending from said wall portions respectively and outwardly away from said wall portions in substantial parallelism with said side portion; said flanges, of said pair of hat-shaped in cross-section members, being secured together and extending outwardly beyond said wall portions thereof; wooden members having grooves therein in which said flanges are disposed; and means for securing said flanges in said groove portions; compression and tension resisting strips disposed between said flanges and secured thereto.

4. In a beam construction the combination of: a pair of generally hat-shaped in cross-section members disposed in opposed relationship to each other; each hat-shaped in cross-section member having a vertically disposed side portion; a pair of horizontally disposed wall portions integral with and at right angles to said side portion; a pair of vertically disposed flanges extending from said wall portions respectively and outwardly away from said wall portions in substantial parallelism with said side portion; said flanges, of said pair of hat-shaped in cross-section members, being secured together and extending outwardly beyond said wall portions thereof; wooden members having grooves therein in which said flanges are disposed; and means for securing said flanges in said groove portions; compression and tension resisting strips disposed between said flanges and secured thereto; adhesive material securing said wooden members to said flanges and said walls of said section.

References Cited by the Examiner

UNITED STATES PATENTS

| 1,688,016 | 10/1928 | Klassen | 52—376 |
| 2,233,190 | 2/1941 | Amorosi | 52—615 |

FOREIGN PATENTS

| 923,010 | 6/1947 | France. |
| 6,439 | 5/1885 | Great Britain. |
| 560,461 | 4/1944 | Great Britain. |

FRANK L. ABBOTT, Primary Examiner.

RICHARD W. COOKE, JR., Examiner.

L. R. RADANOVIC, M. O. WARNECKE,
Assistant Examiners.